United States Patent
Parmentier

(12) 
(10) Patent No.: US 6,442,375 B1
(45) Date of Patent: Aug. 27, 2002

(54) SYSTEMS AND METHODS FOR MAINTAINING OPERATION OF A RECEIVER CO-LOCATED WITH A TRANSMITTER AND SUSCEPTIBLE TO INTERFERENCE THEREFROM BY DESENSITIZATION OF THE RECEIVER

(75) Inventor: Jack D. Parmentier, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/353,238

(22) Filed: Jul. 14, 1999

(51) Int. Cl.[7] .................................................. H04B 1/44
(52) U.S. Cl. ...................... 455/78; 455/250.1; 455/295; 455/296
(58) Field of Search ................................ 455/78, 250.1, 455/278.1, 295, 296, 310, 311, 317, 552, 553

(56) References Cited

U.S. PATENT DOCUMENTS

| | | | |
|---|---|---|---|
| 5,825,327 A | | 10/1998 | Krasner ....................... 342/357 |
| 6,107,960 A | * | 8/2000 | Krasner ................. 342/357.09 |
| 6,144,473 A | * | 11/2000 | Rokhsaz et al. ............ 359/152 |

FOREIGN PATENT DOCUMENTS

WO    WO 99/36795    7/1999

OTHER PUBLICATIONS

International Search Report, PCT/US00/14421, Sep. 1, 2000.
Jaap Haartsen, "Bluetooth—The universal radio interface for *ad hoc*, wireless connectivity," Ericsson Review, No. 3, 1998, 9 pgs.

* cited by examiner

*Primary Examiner*—Lee Nguyen
(74) *Attorney, Agent, or Firm*—Myers Bigel Sibley & Sajovec

(57) ABSTRACT

Systems and methods can be used to maintain operation of a receiver co-located with a transmitter in a communication device and susceptible to interference therefrom by anticipating the intervals during which the transmitter is active (i.e., transmitting) and then desensitizing the receiver during that interval. Although the receiver may operate in a reduced capacity due to periodic desensitization, the adverse effects of interference generated by the transmitter can be avoided. For example, interference from the transmitter can cause variables, such as the gain applied by an automatic gain control module at the receiver input, to deviate from a normal operating or steady state value, which must then be recovered when the interference from the transmitter ceases.

47 Claims, 9 Drawing Sheets

SYSTEMS AND METHODS FOR MAINTAINING OPERATION OF A RECEIVER CO-LOCATED WITH A TRANSMITTER AND SUSCEPTIBLE TO INTERFERENCE THEREFROM BY DESENSITIZATION OF THE RECEIVER

FIELD OF THE INVENTION

The present invention relates generally to the field of communication, and, more particularly, to communication devices having a co-located transmitter and receiver in which the transmitter can interfere with the operation of the receiver.

BACKGROUND OF THE INVENTION

Wireless communicators are being used in ever increasing numbers for voice calls, data calls, facsimile transfer, Internet access, paging, and other personal organization features such as calendar management or even travel directions via the Global Positioning System (GPS). GPS is a worldwide navigation system that is based on a constellation of satellites, which are used as reference points to calculate positions on earth. More specifically, GPS uses a technique known as "triangulation" in which the GPS receiver determines the distance to particular satellites using the travel time of the GPS signals transmitted by those satellites. In addition to determining the distance to a transmitting satellite, the receiver may also obtain information from a GPS signal that indicates the position of the transmitting satellite in space. Finally, the receiver may correct for delay that a GPS signal can experience in traveling through the atmosphere.

As used herein, the term "wireless communicator" can include a cellular radiotelephone with a multi-line display, a Personal Communications System (PCS) terminal that may combine a cellular radiotelephone with data processing, facsimile and data communications capabilities, a Personal Digital Assistant (PDA) that can include a radiotelephone, pager, Internet/intranet access, Web browser, organizer, calendar and/or a GPS receiver, and conventional laptop and/or palmtop receivers that include radiotelephone transceivers. Wireless communicators also may be referred to as "pervasive computing" devices.

Wireless communicators that include both a cellular radiotelephone and a GPS receiver, for example, may be susceptible to interference between the cellular phone transmitter circuitry and the GPS receiver circuitry. With reference to FIG. 1, a wireless communicator 22 is illustrated in which a GPS receiver 24 and a cellular transceiver 26 are co-located. Because the wireless communicator 22 may be relatively small and have minimal separation between the GPS antenna 28 and the cellular antenna 32, it is not uncommon for radio frequency (RF) signals transmitted from the cellular transceiver 26 to couple from the cellular antenna 32 to the GPS antenna 28. As a result, this unwanted interference from the cellular transceiver 26 may inhibit operation of the GPS receiver 24.

In addition to interfering with the reception and decoding of a GPS signal while the cellular transceiver 26 is transmitting, operation of the GPS receiver 24 may also be disrupted while the cellular transceiver 26 is idle or is in a receive mode. As shown in FIG. 1, an automatic gain control (AGC) module 34 is typically used to adjust the gain of the signal received through the GPS antenna 28 to a power level suitable for processing by the GPS receiver 24. The coupling of an RF signal from the cellular antenna 32 to the GPS antenna 28, however, generally increases the strength of the signal applied to the input of the GPS receiver 24. Therefore, the AGC module 34 may reduce the gain applied at a multiplier 36 when the cellular transceiver 26 transmits. When the cellular transceiver 26 transitions to an idle mode or a receive mode for the particular communication protocol that it is implementing, the gain applied by the AGC module 34 may be insufficient to provide a suitable signal power level at the input of the GPS receiver 24. The AGC module 34 may thus increase the gain in response to the lower power level of the signal from the GPS antenna 28, but the cellular transceiver 26 may eventually transition back into the transmit mode, thereby causing the cycle to repeat.

Thus, it can be difficult to maintain operation of the GPS receiver 24 when it is co-located with a cellular transceiver 26. When the cellular transceiver 26 is transmitting, the transmitted signal can interfere with the reception and decoding of a GPS signal by the GPS receiver 24. When the cellular transceiver 26 is idle or is receiving a cellular signal, the GPS signal received at the GPS receiver 24 may be too weak to decode because the gain applied by the AGC module 34 has been reduced from its normal operating value due to the prior interference from the signal transmitted by the cellular transceiver 26.

Consequently, a need exists for improved communication devices in which the operation of a receiver can be maintained notwithstanding interference from a co-located transmitter.

SUMMARY OF THE INVENTION

It is therefore an object of the present invention to provide improved communication devices in which a receiver is co-located with a transmitter and is susceptible to interference therefrom.

It is another object of the present invention to provide systems and methods that can be used to maintain operation of a receiver in a communication device that is subject to interference from a co-located transmitter during periodic transmission intervals.

These and other objects, advantages, and features of the present invention may be provided by systems and methods that can be used to maintain the operation of a receiver co-located with a transmitter in a communication device and susceptible to interference therefrom by anticipating the intervals during which the transmitter is active (i.e., transmitting) and then desensitizing the receiver during that interval. Although the receiver may operate in a reduced capacity due to periodic desensitization, the adverse effects of interference from the signal generated by the transmitter can be avoided. For example, interference from the transmitter can cause variables, such as the gain applied by an AGC module at the receiver input, to deviate from a normal operating or steady state value, which must then be recovered when the interference from the transmitter ceases.

In accordance with an illustrative embodiment of the present invention, control logic is used to monitor a signal generated by the transmitter. By monitoring the aforementioned signal, the control logic is able to anticipate the beginning of the transmission intervals and generate a control signal that identifies or corresponds to the intervals in which the transmitter is active or transmitting. This control signal is then supplied to an automatic gain control module to maintain the gain applied at the input of a second receiver at or above its current level. Advantageously, if the signal transmitted by the transmitter is coupled to the second receiver thereby causing interference, then the automatic gain control module will not reduce the gain applied due to the enhanced signal strength resulting from the interference. When a transmission interval completes, the gain provided by the automatic gain control module is therefore at a proper level for normal or steady state operation.

In accordance with another illustrative embodiment of the invention, control logic is. used to anticipate the beginning of a transmission interval; however, the control signal generated in response thereto is used to drive a switch that electrically isolates the second receiver from an antenna associated therewith during the transmission interval.

In accordance with still another illustrative embodiment of the invention, a communication protocol (e.g., a protocol based on time division multiple access (TDMA) technology) program is used that anticipates the active or transmission intervals of the transmitter and generates a control signal via a processor to desensitize the receiver during these intervals.

The present invention can allow, for example, a GPS receiver, co-located in a cellular phone terminal, to operate almost simultaneously with a TDMA transmitter. Heretofore, in an application where there is minimal antenna isolation between the GPS receiver antenna and the cellular phone antenna, operation of the GPS receiver may be severely hampered due to disruption of the gain applied by an automatic gain control module at the input of the GPS receiver.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
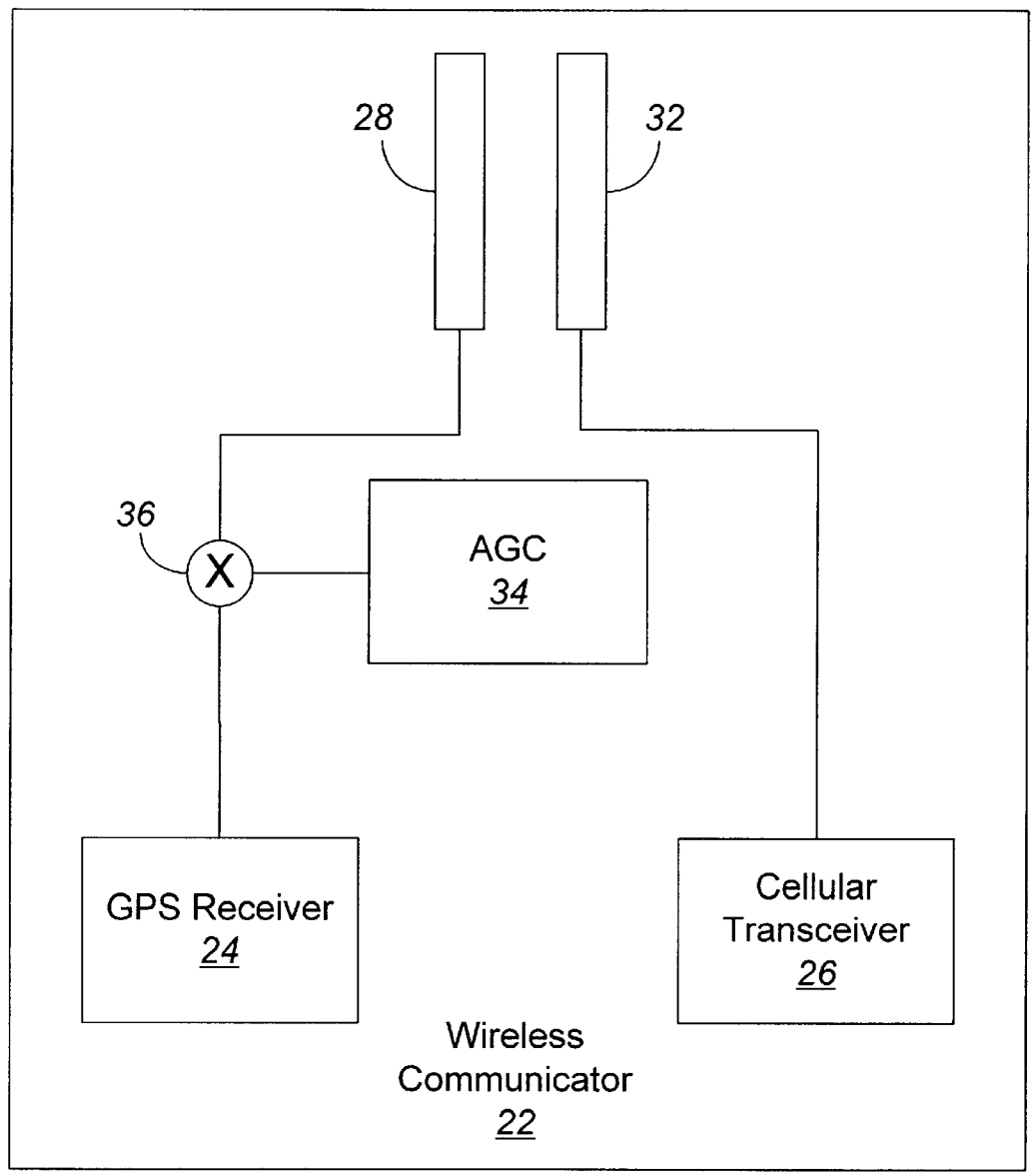
FIG. 1 is a block diagram of a conventional wireless communicator including a GPS receiver co-located with a cellular transceiver.

While the invention is susceptible to various modifications and alternative forms. specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

For purposes of illustration and in no way limited thereto, systems and methods for maintaining operation of a receiver co-located with a transmitter will be discussed hereafter in connection with a wireless communicator comprising a GPS receiver and a cellular transceiver using TDMA technology (e.g., the Telecommunication Industry Association (TIA)/Electronic Industries Association (EIA) 136 or digital advanced mobile phone service (DAMPS) standard). It should be understood, therefore, that the systems and methods according to the present invention can be applied generally to communication devices in which a receiver co-located with a transmitter is susceptible to interference from a signal transmitted by the transmitter.

Figure 2:
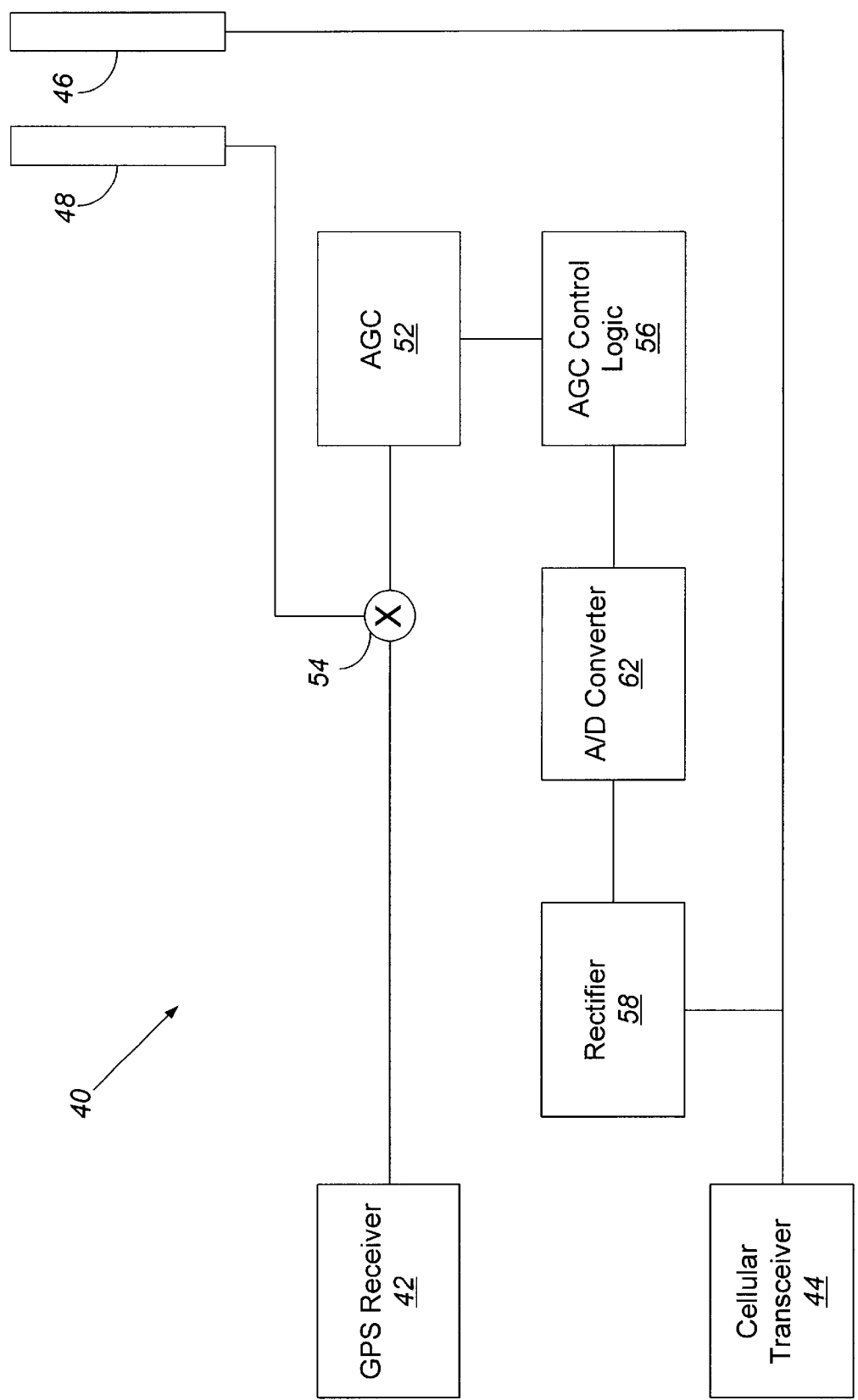
FIG. 2 is a block diagram illustrating an exemplary system for maintaining operation of a GPS receiver co-located with a cellular transceiver according to a first embodiment of the present invention.

FIG. 2 is a block diagram illustrating systems and methods for maintaining operation of a GPS receiver co-located with a cellular transceiver in accordance with a first embodiment of the present invention. As shown in FIG. 2, a wireless communicator 40 includes a GPS receiver 42 co-located with a cellular transceiver 44. The cellular transceiver 44 includes both a transmit and a receive capability, which may be embodied as separate components as is understood by those skilled in the art. The cellular transceiver 44 is configured to communicate using TDMA wireless access technology. It should be understood that alternative wireless access technologies can be used without departing from the principles of the present invention. Preferably, the communication protocol associated with the wireless access technology includes periodic intervals during which the cellular transceiver 44 is not transmitting.

The wireless communicator 40 further includes a cellular antenna 46 and a GPS antenna 48 that may be imperfectly isolated from each other. For example, when multiple radio band antennas are co-located in the same housing, antenna isolation is typically in the range of 10 dB–15 dB. Assuming that the cellular transceiver 44 transmits at a power level of 26 dB and there is only 10 dB–15 dB separation between the antennas 46, 48, the transmitted TDMA signal may be coupled to the input of the GPS receiver 42 at a power level of 11 dB–16 dB. This superimposed TDMA signal can interfere with the reception and decoding of the GPS signal at the GPS receiver 42.

Figure 8:
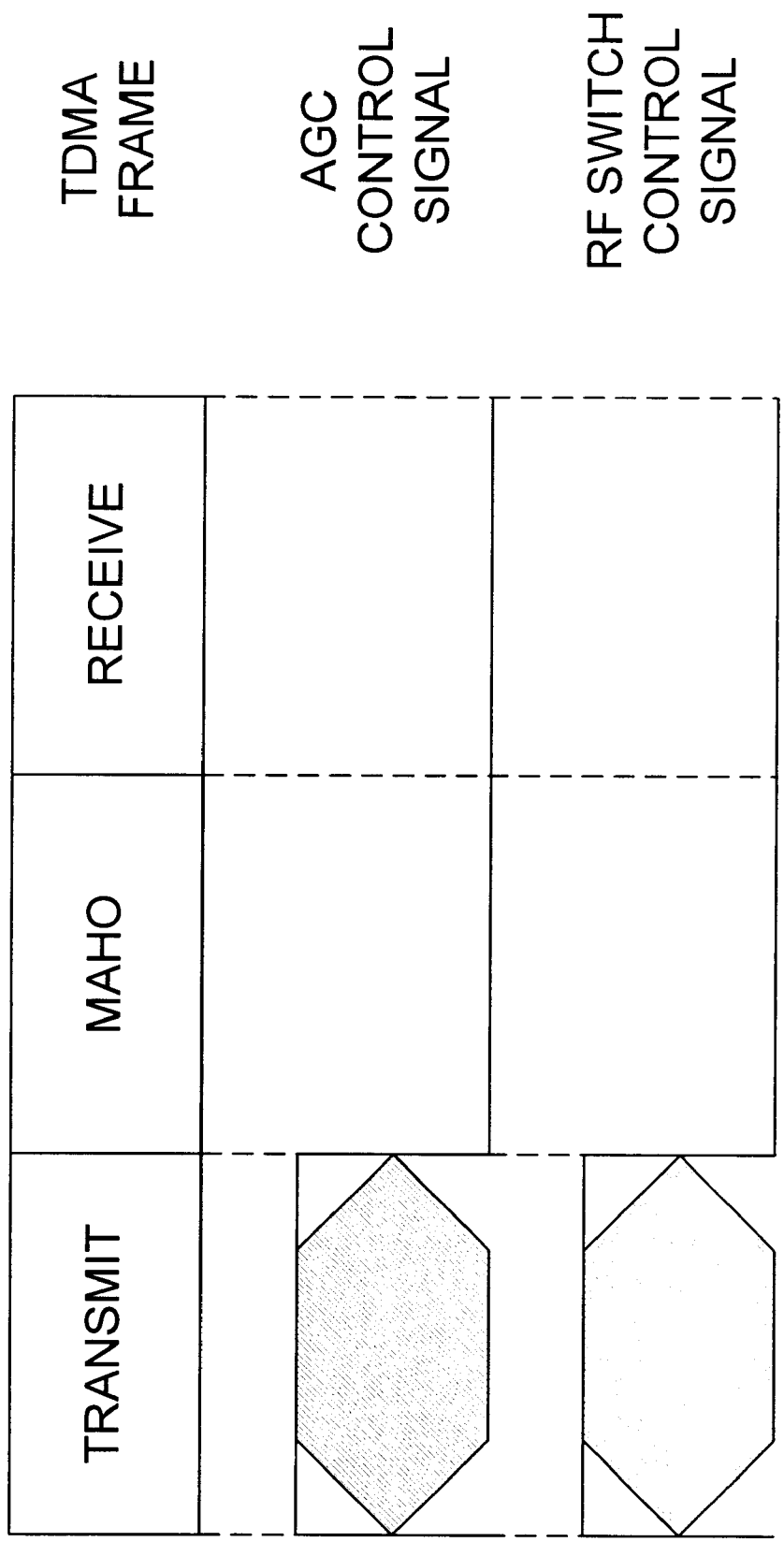
FIG. 8 illustrates signal-timing diagrams associated with the embodiments of FIGS. 2–7.

It may be helpful to briefly review the nature of the interference with GPS signal reception that may be caused by the cellular transmitter 44 and was discussed previously hereinbefore. With reference to FIG. 8, a TDMA frame comprises a transmit interval, a mobile assisted handoff (MAHO) interval, and a receive interval. During the transmit interval, the TDMA signal transmitted by the cellular transceiver 44 can be coupled to the input of the GPS receiver 42 through the GPS antenna 48, which can disrupt the reception and decoding of the GPS signal at the GPS receiver 42. In addition, however, the signal applied to the input of the GPS receiver, which is a combination of the desired GPS signal and the undesired TDMA signal, generally exhibits an enhanced power level due to the addition of the TDMA signal. As a result, an AGC module 52 may reduce the gain applied to the signal at the input of the GPS receiver 42 through a multiplier 54.

Referring again to FIG. 8, a MAHO interval and a receive interval are shown, for example, to follow the transmit interval in a conventional TDMA frame. While a TDMA transmitter is active during the transmit interval, the TDMA transmitter is generally inactive during the MAHO and receive intervals when the TDMA receiver is active. The MAHO interval is used to monitor the signal strength of the setup channels of neighboring cells to identify potential candidates for handoff should the signal strength of the voice channel in the current cell become too weak. The receive interval is complementary to the transmit interval to provide full duplex communication with another party. Thus, the cellular transceiver 44 does not transmit during either the MAHO or receive intervals, thereby ending the interference with the GPS receiver due to coupling of the TDMA signal through the GPS antenna 48. Nevertheless, the residual effect of the TDMA signal transmitted from the cellular transceiver 44 may still remain. Moreover, FIG. 8 illustrates a single TDMA frame. The cellular transceiver 44 may transmit and receive during portions of each of a plurality of successive TDMA frames. Furthermore, each TDMA frame may include periods during which the transceiver is neither transmitting nor receiving.

At the end of the transmit interval, the gain applied to the signal at the input of the GPS receiver 42 through the multiplier 54 is typically reduced by the AGC module 52 due to the enhanced signal strength provided by the undesired TDMA signal. Therefore, even though the interference from the TDMA signal transmitted by the cellular transmitter 44 will have ceased at the beginning of the MAHO interval, the GPS receiver 42 may not be able to decode the GPS signal because the gain applied to the GPS signal by the AGC module 52 through the multiplier 54 is too low. The AGC module 52 will begin to raise the gain applied at the multiplier 54 as it detects the reduced signal strength of GPS signal as compared to the combination of the GPS signal and the coupled TDMA transmission signal. Nevertheless, there will be some latency or delay before a suitable gain is applied at the multiplier 54, which may disrupt GPS reception and decoding for some period during the MAHO interval and possibly the receive interval (or during any interval without transmission by the transceiver 44) following an interval with transmission.

It can be seen, therefore, that successful GPS reception and decoding can be achieved during the MAHO and receive intervals (or any other intervals without transmission) after the AGC module 52 has detected the absence of the coupled TDMA signal from the cellular transceiver 44 and adjusted the gain accordingly. The interval during which GPS operation is feasible is thus dependent upon the sensitivity and responsiveness of the AGC module 52 and the length of the MAHO and receive intervals of the TDMA frame. Unfortunately, in some circumstances the gain applied by the AGC module 52 may be increased to a level sufficient to support GPS reception and decoding just prior to the beginning of the transmit interval of the next TDMA frame, which may not be long enough to provide practical GPS service.

The present invention maintains operation of the GPS receiver 42 by using AGC control logic 56 that is responsive to the TDMA radio signal that is transmitted by the cellular transceiver 44. More specifically, the AGC control logic 56 monitors this transmission signal to anticipate the beginning of the transmit interval. As a result, the AGC control logic 56 identifies the beginning of the transmit interval and generates a control signal, which is applied to the AGC module 52 to preserve the gain value (i.e., prevents the gain value from being reduced) that is applied to the input signal of the GPS receiver 42 through the multiplier 54. Thus, the GPS receiver 42 is desensitized to the effects of the TDMA signal transmitted by the cellular transceiver 44. The AGC control logic 56 continues to monitor the TDMA radio signal that is transmitted by the cellular transceiver 44 to determine the end of the transmit interval. During the MAHO and receive intervals (and other intervals during which the transceiver 44 does not transmit), the AGC control logic 56 ceases generation of the control signal to allow the AGC module 52 to adjust the gain applied in accordance with the strength of the GPS signal. This procedure is illustrated, for example, in FIG. 8 where the AGC control signal is driven high during the transmit interval and is driven low during the MAHO and receive intervals.

Preferably, a rectifier 58 is used to convert the TDMA radio signal to a DC value, which is then converted to digital form by an analog to digital (A/D) converter 62. AGC control logic 56 can then be implemented as digital logic to process the digital information output from the A/D converter 62.

Note that GPS reception and decoding will still be subject to interference from the TDMA signal transmitted,by the cellular transceiver 44 during the transmit interval. Nevertheless, by preventing the AGC module 52 from oscillating due to the cyclical application of a TDMA interference signal during successive TDMA frames, GPS operation can be successfully maintained during the MAHO and receive intervals.

Figure 3A:
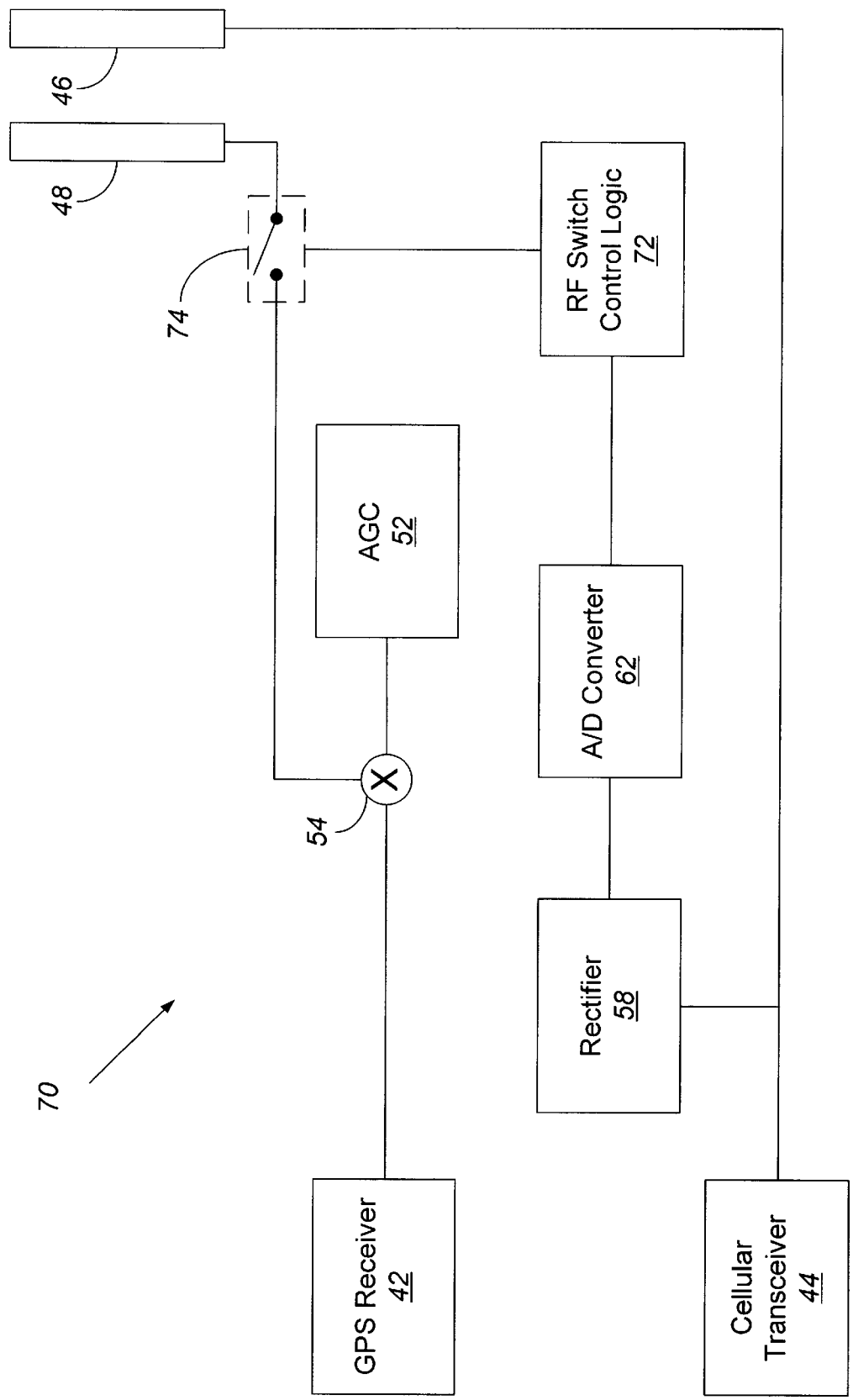
FIG. 3A is a block diagram illustrating an exemplary system for maintaining operation of a GPS receiver co-located with a cellular transceiver according to a second embodiment of the present invention.

FIG. 3A is a block diagram illustrating systems and methods for maintaining operation of a GPS receiver co-located with a cellular transceiver in accordance with a second embodiment of the present invention. The wireless communicator 70 illustrated in FIG. 3A is substantially similar to the wireless communicator 40 of FIG. 2. Instead of using AGC control logic 56, however, RF switch control logic 72 is used that is responsive to the TDMA radio signal that is transmitted by the cellular transceiver 44. More specifically, the RF switch control logic 72 monitors this transmission signal to anticipate the beginning of the transmit interval. As a result, the RF switch control logic 56 identifies the beginning of the transmit interval and generates a control signal that causes a switch 74 to open when applied thereto. Because the switch 74 and the GPS receiver 42 are connected in series, the GPS receiver 42 is electrically isolated from the GPS antenna 48 when the switch 74 is open.

Thus, the GPS receiver 42 and the AGC module 52 are desensitized to the effects of the TDMA signal transmitted by the cellular transceiver 44 when the switch 74 is in the open position. Complete isolation of the GPS receiver 42 may be preferred during the TDMA transmit interval particularly when the cellular transceiver 44 transmits at very high power levels. The RF switch control logic 72 continues to monitor the TDMA radio signal that is transmitted by the cellular transceiver 44 to determine the end of the transmit interval. During the MAHO and receive intervals, the RF switch control logic 72 ceases generation of the control signal to allow the switch 74 to close, thereby electrically reconnecting the GPS receiver 42 with the GPS antenna 48. This procedure is illustrated, for example, in FIG. 8 where the RF switch control signal is driven high during the transmit interval and is driven low during the MAHO and receive intervals.

Figure 3B:
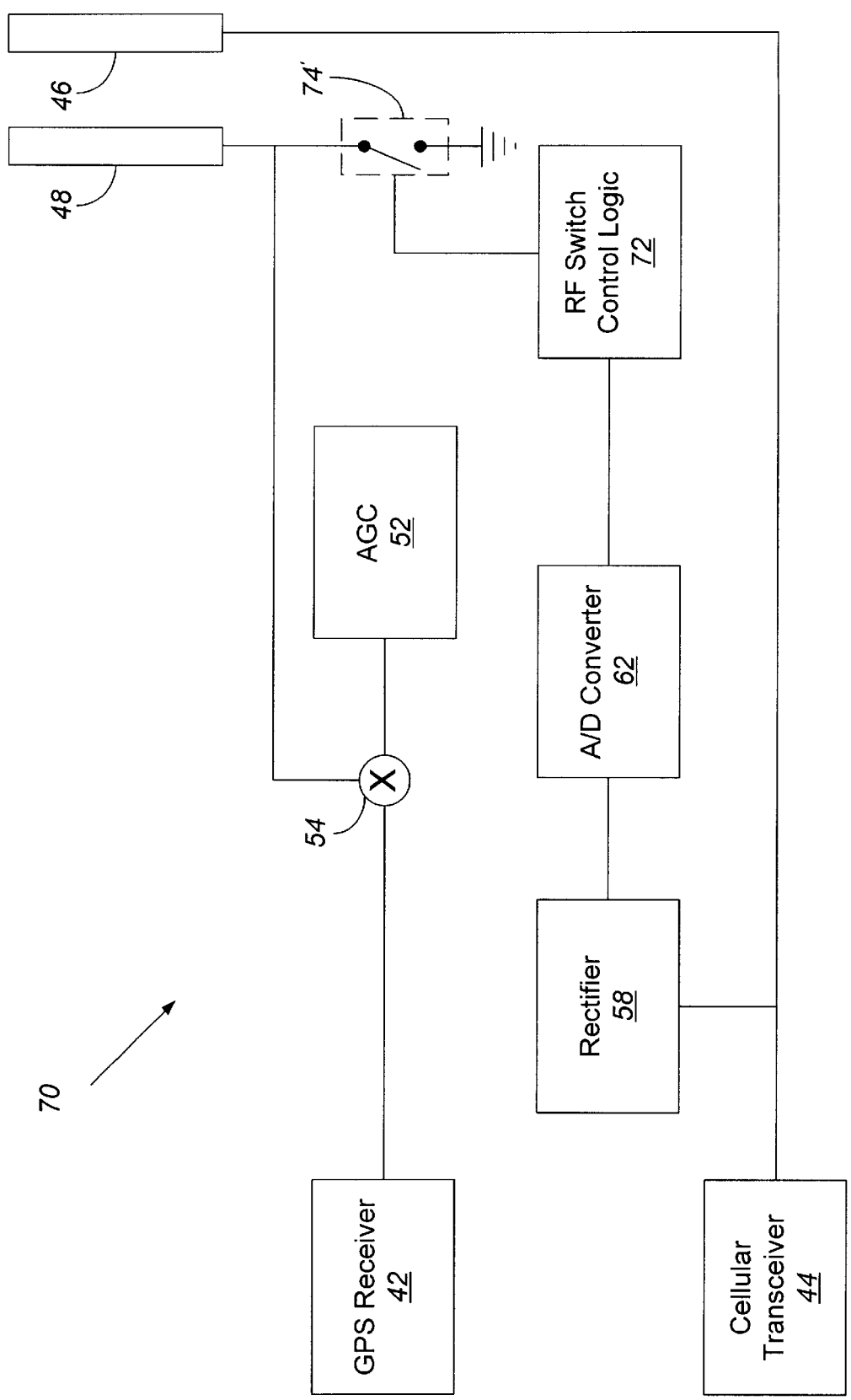
FIG. 3B is a block diagram illustrating an alternative configuration for the switch of FIG. 3A.
Figure 4:
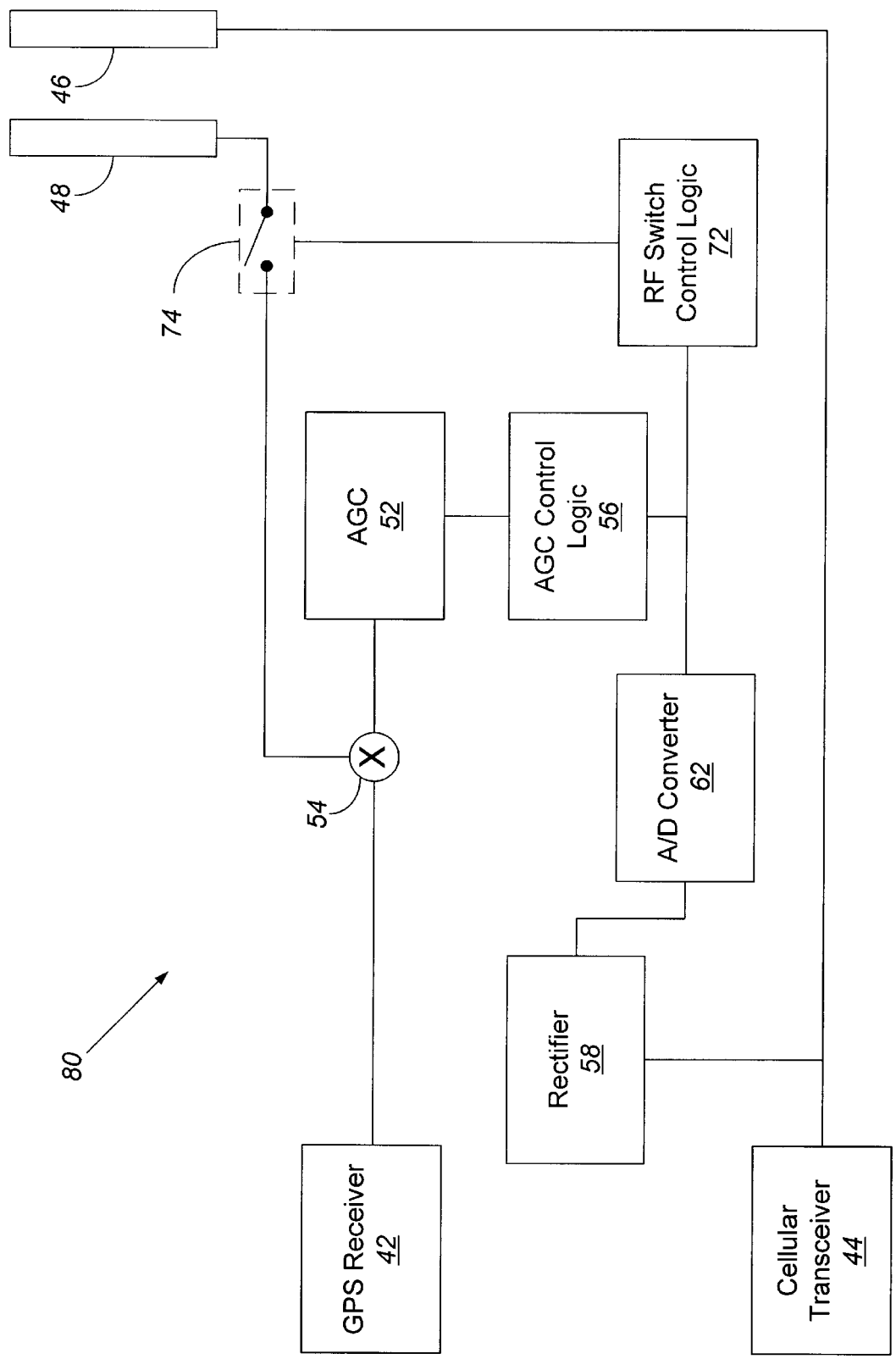
FIG. 4 is a block diagram illustrating an exemplary system for maintaining operation of a GPS receiver co-located with a cellular transceiver according to a third embodiment of the present invention that combines aspects of the FIG. 2 and FIG. 3A embodiments.

An alternative configuration for the switch 74 of FIG. 3A is shown in FIG. 3B. In the FIG. 3B embodiment, the switch 74' is connected in parallel between the GPS antenna 48 and the GPS receiver 42 such that the GPS antenna 48 is shorted to ground when the switch 74' is closed. Note that the operations of switch 74 of FIG. 3A and switch 74' of FIG. 3B are opposite. That is, the GPS receiver 42 and the AGC module 52 are desensitized by causing the switch 74' to close through a control signal generated by the RF switch control logic 72 in FIG. 3B. Conversely, the GPS receiver 42 and the AGC module 52 are desensitized by causing the switch 74 to open through a control signal generated by the RF switch control logic 72 in FIG. 3A FIG. 4 is a block diagram illustrating systems and methods for maintaining operation of a GPS receiver co-located with a cellular transceiver in accordance with a third embodiment of the present invention. The wireless communicator 80 illustrated in FIG. 4 uses both the AGC control logic 56 of FIG. 2 and the RF switch control logic 72 of FIGS. 3A–3B. Because the response times for operating the switch 74 and the AGC module 52 may differ, and the response time of the AGC control logic 56 and the RF switch control logic 72 may also differ, this embodiment ensures that the GPS receiver 42 and the AGC module 52 are desensitized to the effects of the transmitted TDMA signal via whichever of the two means is faster. It should also be understood that while the switch 74 in FIG. 4 is configured in series with the GPS receiver 42 as discussed hereinbefore with reference to FIG. 3A, the switch 74 may alternatively be configured between the GPS antenna 48 and ground as discussed and illustrated hereinbefore with reference to FIG. 3B.

Figure 5:
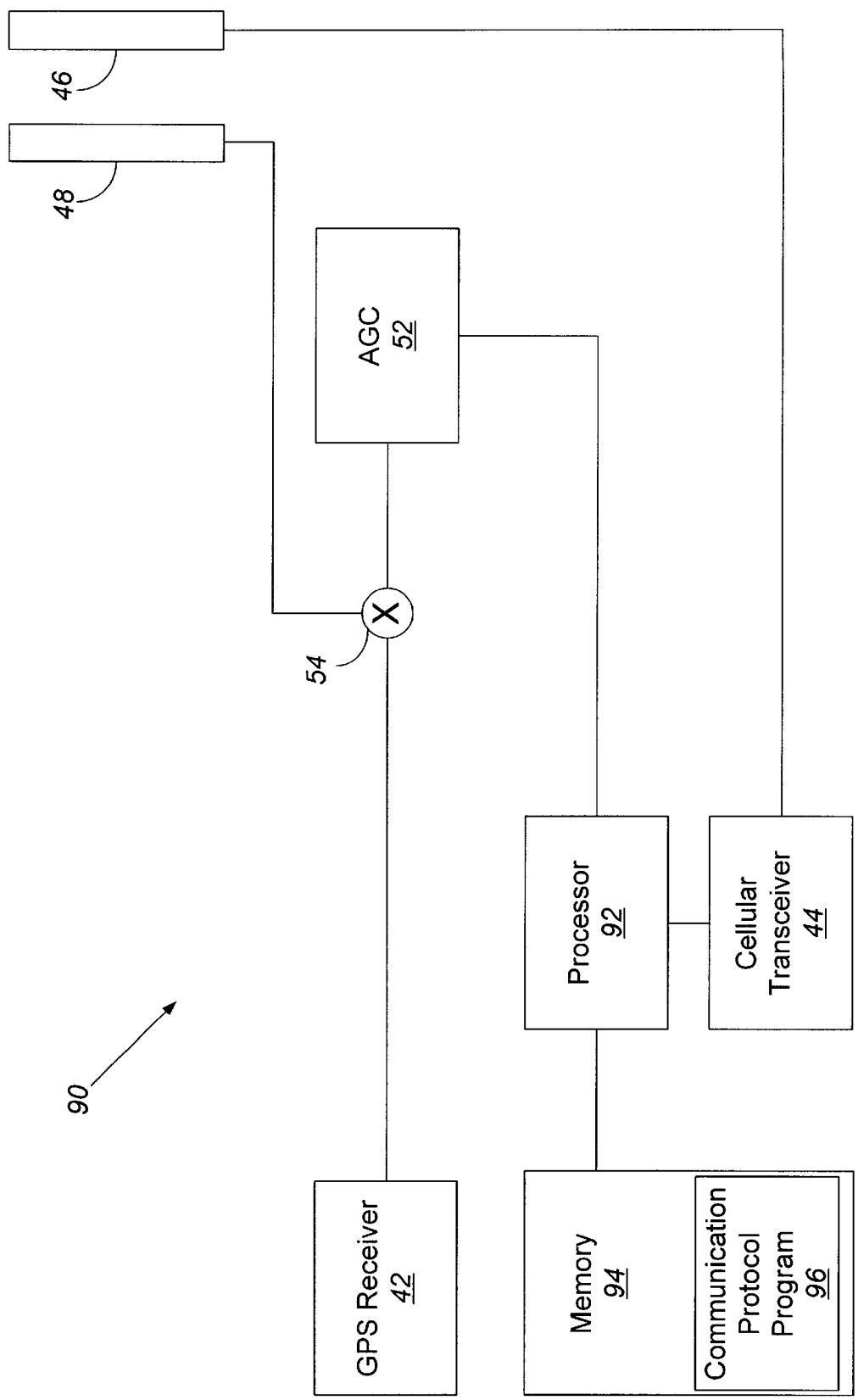
FIG. 5 is a block diagram illustrating an exemplary system for maintaining operation of a GPS receiver co-located with a cellular transceiver according to a fourth embodiment of the present invention.

FIG. 5 is a block diagram illustrating systems and methods for maintaining operation of a GPS receiver co-located with a cellular transceiver in accordance with a fourth embodiment of the present invention. The wireless communicator 90 is based on a similar architecture as the embodiments of FIGS. 2, 3A, 3B, and 4. By contrast, however, the wireless communicator 90 does not include AGC control logic 56 nor RF switch control logic 72. Operation of the AGC module 52 is maintained through use of a processor 92, which communicates with a computer readable storage medium or memory 94. The present invention can therefore take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

The memory 94 includes a communication protocol program 96 that controls operations of the cellular transceiver 44 in implementing a communication session. Recall that the communication protocol corresponds to a particular wireless access technology being used, such as TDMA. Thus, the communication protocol program 96 is responsive to call setup information received by the cellular transceiver 44 that, in the case of TDMA, identifies particular time slots or intervals in each TDMA frame during which the transceiver 44 can transmit.

The communication protocol program 96 can thus use this knowledge of the intervals or time slots that will be used for transmission by the cellular transceiver in the TDMA frames to generate a control signal from the processor 92 that identifies or corresponds to these transmission intervals. This control signal can then be applied to the AGC module 52 to preserve the gain value (i.e., prevent the gain value from being reduced) as discussed hereinbefore.

Figure 6:
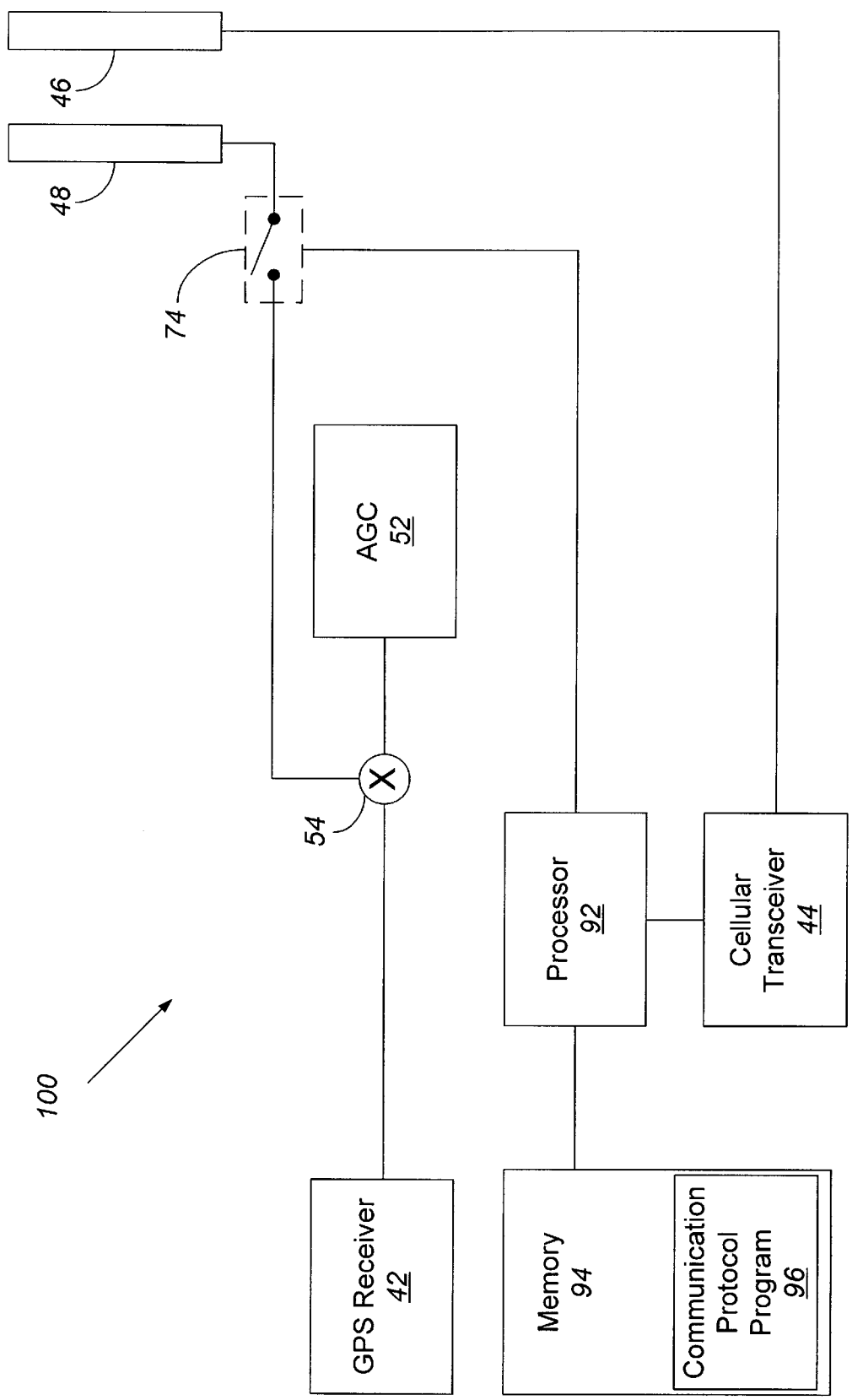
FIG. 6 is a block diagram illustrating an exemplary system for maintaining operation of a GPS receiver co-located with a cellular transceiver according to a fifth embodiment of the present invention.

FIG. 6 is a block diagram illustrating systems and methods for maintaining operation of a GPS receiver co-located with a cellular transceiver in accordance with a fifth embodiment of the present invention. The wireless communicator 110 illustrated in FIG. 6 is substantially similar to the wireless communicator 90 of FIG. 5. Instead of using the control signal generated from the processor 92 to preserve the gain applied by the AGC module 52; however, the control signal is applied to a switch 74 that is configured in series with the GPS receiver 42. During a transmission interval, the control signal causes the switch 74 to open thereby electrically isolating the GPS receiver 42 from the GPS antenna 48. It should also be understood that while the switch 74 in FIG. 6 is configured in series with the GPS receiver 42, the switch 74 may alternatively be configured between the GPS antenna 48 and ground as discussed and illustrated hereinbefore with reference to FIG. 3B.

Figure 7:
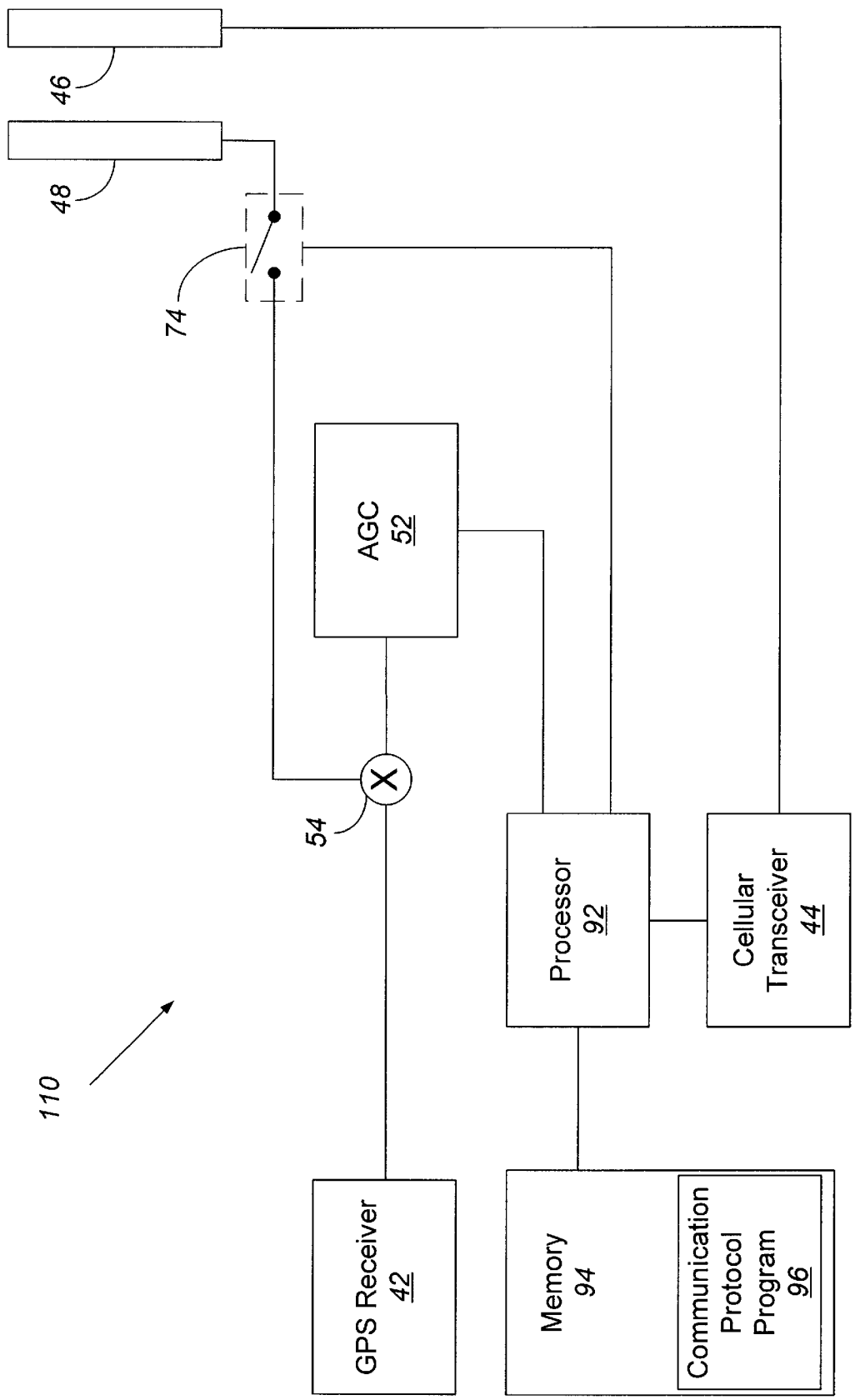
FIG. 7 is a block diagram illustrating an exemplary system for maintaining operation of a GPS receiver co-located with a cellular transceiver according to a third embodiment of the present invention that combines aspects of the FIG. 5 and FIG. 6 embodiments.

Lastly, FIG. 7 is a block diagram illustrating systems and methods for maintaining operation of a GPS receiver co-located with a cellular transceiver in accordance with a sixth embodiment of the present invention. The wireless communicator 110 illustrated in FIG. 4 uses two control signals—one control signal is provided by the processor 92 to the AGC module as discussed hereinabove with reference to FIG. 5 and a second control signal is provided by the processor 92 to the switch 74 as discussed hereinabove with reference to FIG. 6. Because the response times for operating the switch 74 and the AGC module 52 may differ, this embodiment ensures that the GPS receiver 42 and the AGC module 52 are desensitized to the effects of the transmitted TDMA signal via whichever of the two means is faster. Again, it should be understood that while the switch 74 in FIG. 7 is configured in series with the GPS receiver 42, the switch 74 may alternatively be configured between the GPS antenna 48 and ground as discussed and illustrated hereinbefore with reference to FIG. 3B.

The principles of the present invention have been illustrated herein as they are applied to a GPS receiver 42. It should be understood, however, that the principles are equally applicable to alternative receiver types that may be susceptible to interference from a signal generated by a co-located transmitter and could benefit from desensitization during transmission intervals. One such example is a Bluetooth receiver. Bluetooth is a universal radio interface in the 2.45 GHz frequency band that enables portable electronic devices to connect and communicate wirelessly via shortrange, ad hoc networks. Bluetooth technology is generally targeted towards the elimination of wires, cables, and connectors between such devices and systems as cordless or mobile phones, modems, headsets, PDAs, computers, printers, projectors, and local area networks. More information on the Bluetooth interface can be found in an article authored by Jaap Haartsen entitled "Bluetooth—The universal radio interface for ad hoc, wireless connectivity," Ericsson Review, No. 3, 1998, which is hereby incorporated herein by reference.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

I claim:

1. A system for maintaining operation of a communication device, comprising:

a transmitter that implements a communication protocol having active and inactive transmission intervals;

a receiver that is susceptible to interference from the transmitter during active transmission intervals;

control logic that anticipates the active transmission intervals and generates a control signal; and an automatic gain control, responsive to the control signal, which maintains during an active transmission interval a gain applied at an input of the receiver during a preceding inactive transmission interval.

2. A system as recited in claim 1, further comprising:

a rectifier, responsive to the transmitter, that generates a direct current signal; and an analog to digital converter that generates a digital signal in response to the direct current signal and provides the digital signal to the control logic.

3. A system as recited in claim 1, wherein the control logic comprises:

a computer readable storage medium having computer readable program code means that anticipate the active transmission intervals; and a processor, responsive to th e computer readable program code means, that generates the control signal.

4. A system as recited in claim 1, further comprising:

a switch, responsive to the control signal that electrically isolates the receiver from the transmitter.

5. A system as recited in claim 4, wherein the switch is connected in series between the receiver and an antenna.

6. A system as recited in claim 4, wherein the switch is connected between an antenna that is electrically connected to the receiver and ground.

7. A system as recited in claim 1, wherein the receiver is a global positioning system (GPS) receiver.

8. A system as recited in claim 1, wherein the receiver is a Bluetooth receiver.

9. A system as recited in claim 1, wherein the communication protocol is based on TDMA wireless access technology.

10. A method of maintaining operation of a communication device, comprising the steps of:

providing a transmitter that implements a communication protocol having active and inactive transmission intervals;

providing a receiver that is susceptible to interference from the transmitter during active transmission intervals;

anticipating the active transmission intervals; and maintaining during an active transmission interval a gain applied at an input of the receiver during a preceding inactive transmission interval in response to the anticipating step.

11. A method as recited in claim 10, wherein the maintaining step comprises:

preventing a gain applied at an input of the receiver from being reduced.

12. A method as recited in claim 10, wherein the maintaining step comprises:

electrically isolating the receiver from the transmitter.

13. A method as recited in claim 12, wherein the isolating step comprises:

disconnecting the receiver from an antenna electrically connected thereto.

14. A method as recited in claim 12, wherein the isolating step comprises:

grounding an antenna electrically connected to the receiver.

15. A method as recited in claim 10, wherein the anticipating step comprises:

converting an analog signal generated by the transmitter to a digital signal; and generating a control signal in response to the digital signal that identifies the active transmission intervals.

16. A method as recited in claim 10, wherein the communication protocol is based on TDMA wireless access technology.

17. A system for maintaining operation of a communication an device, comprising:

means for providing a transmitter that implements a communication protocol having active and inactive transmission intervals means for providing a receiver that is susceptible to interference from the transmitter during active transmission intervals;

means for anticipating the active transmission intervals; and means, responsive to the means for anticipating, for maintaining during an active transmission interval a gain applied at an input of the receiver during a preceding inactive transmission interval.

18. A system as recited in claim 17, wherein the means for maintaining comprises:

means for preventing a gain applied at an input of the receiver from being reduced.

19. A system as recited in claim 17, wherein the means for maintaining comprises:

means for electrically isolating the receiver from the transmitter.

20. A system as recited in claim 19, wherein the means for isolating comprises:

means for disconnecting the receiver from an antenna electrically connected thereto.

21. A system as recited in claim 19, wherein the means for isolating comprises:

means for grounding an antenna electrically connected to the receiver.

22. A system as recited in claim 17, wherein the means for anticipating comprises:

signal means for converting an analog signal generated by the-transmitter to a digital signal; and means, responsive to the digital signal, for generating a control signal that identifies the active transmission intervals.

23. A system as recited in claim 17, wherein the receiver is a global positioning system (GPS) receiver.

24. A system as recited in claim 17, wherein the receiver is a Bluetooth receiver.

25. A system as recited in claim 17, wherein the communication protocol is based on TDMA wireless access technology.

26. A system for maintaining operation of a communication device, comprising:

a transmitter that implements a communication protocol having active and inactive transmission intervals;

a receiver that is susceptible to interference from the transmitter during active transmission intervals;

a rectifier, responsive to the transmitter, that generates a direct current signal;

an analog to digital converter that generates a digital signal in response to the direct current signal; and control logic that anticipates the active transmission intervals and generates a control signal in response to the digital signal to desensitize the receiver during the active transmission intervals.

27. A system as recited in claim 26, further comprising:

an automatic gain control, responsive to the control signal that prevents a gain applied at an input of the receiver from being reduced during the active transmission intervals.

28. A system as recited in claim 26, further comprising:

a switch, responsive to the control signal that electrically isolates the receiver from the transmitter.

29. A system as recited in claim 28, wherein the switch is connected in series between the receiver and an antenna.

30. A system as recited in claim 28, wherein the switch is connected between an antenna that is electrically connected to the receiver and ground.

31. A system as recited in claim 26, wherein the receiver is a global positioning system (GPS) receiver.

32. A system as recited in claim 26, wherein the receiver is a Bluetooth receiver.

33. A system as recited in claim 26, wherein the communication protocol is based on TDMA wireless access technology.

34. A method of maintaining operation of a communication device, comprising the steps of:

providing a transmitter that implements a communication protocol having active and inactive transmission intervals;

providing a receiver that is susceptible to interference from the transmitter during active transmission intervals;

generating a direct current signal responsive to operation of the transmitter;

converting the direct current signal to a digital signal;

generating a control signal in response to the digital signal that identifies the active transmission intervals; and desensitizing the receiver in response to the control signal.

35. A method as recited in claim 34, wherein the desensitizing step comprises:

preventing a gain applied at an input of the receiver from being reduced.

36. A method as recited in claim 34, wherein the desensitizing step comprises:

electrically isolating the receiver from the transmitter.

37. A method as recited in claim 36, wherein the isolating step comprises:

disconnecting the receiver from an antenna electrically connected thereto.

38. A method as recited in claim 36, wherein the isolating step comprises:

grounding an antenna electrically connected to the receiver.

39. A method as recited in claim 34, wherein the communication protocol is based on TDMA wireless access technology.

40. A system for maintaining operation of a communication device, comprising:

means for providing a transmitter that implements a communication protocol having active and inactive transmission intervals means for providing a receiver that is susceptible to interference from the transmitter during active transmission intervals;

means, responsive to operation of the transmitter, for generating a direct current signal;

means for converting the direct current signal to a digital signal;

means, responsive to the digital signal, for generating a control signal that identifies the active transmission intervals; and means, responsive to the control signal, for desensitizing the receiver.

41. A system as recited in claim 40, wherein the means for desensitizing comprises:

means for preventing a gain applied at an input of the receiver from being reduced.

42. A system as recited in claim 40, wherein the means for desensitizing comprises:

means for electrically isolating the receiver from the transmitter.

43. A system as recited in claim 42, wherein the means for isolating comprises:

means for disconnecting the receiver from an antenna electrically connected thereto.

44. A system as recited in claim 42, wherein the means for isolating comprises:

means for grounding an antenna electrically connected to the receiver.

45. A system as recited in claim 40, wherein the receiver is a global positioning system (GPS) receiver.

46. A system as recited in claim 40, wherein the receiver is a Bluetooth receiver.

47. A system as recited in claim 40, wherein the communication protocol is based on TDMA wireless access technology.

* * * * *

UNITED STATES PATENT AND TRADEMARK OFFICE
CERTIFICATE OF CORRECTION

PATENT NO.      : 6,442,375 B1
DATED           : August 27, 2002
INVENTOR(S)     : Jack B. Parmentier It is certified that error appears in the above-identified patent and that said Letters Patent is hereby corrected as shown below:

<u>Column 10,</u>
Line 36, should read as follows:
-- tion device, comprising: --

Signed and Sealed this

Eighteenth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,442,375 B1
DATED        : August 27, 2002
INVENTOR(S)  : Jack B. Parmentier It is certified that error appears in the above-identified patent and that said Letters Patent is hereby corrected as shown below:

<u>Column 11,</u>
Line 1, please delete the first occurrence of the word "signal."

Signed and Sealed this

Twenty-fourth Day of June, 2003

JAMES E. ROGAN
*Director of the United States Patent and Trademark Office*